US012810552B2

(12) United States Patent
Rajat et al.

(10) Patent No.: US 12,810,552 B2
(45) Date of Patent: Nov. 24, 2026

(54) METHOD AND SYSTEM FOR ENABLING USERS TO EXPERIENCE AN EXTENDED REALITY-BASED SOCIAL MULTIVERSE

(71) Applicant: FLYING FLAMINGOS INDIA PVT LTD, Bangalore (IN)

(72) Inventors: Gupta Rajat, New Delhi (IN); Agarwal Shourya, Rajasthan (IN); Patil Malhar, Maharashtra (IN); Singh Kushwaha Kalpit, Jaipur (IN)

( * ) Notice: Subject to any disclaimer, the term of this patent is extended or adjusted under 35 U.S.C. 154(b) by 116 days.

(21) Appl. No.: 18/843,239

(22) PCT Filed: Feb. 28, 2023

(86) PCT No.: PCT/IN2023/050183
§ 371 (c)(1),
(2) Date: Aug. 31, 2024

(87) PCT Pub. No.: WO2023/166524
PCT Pub. Date: Sep. 7, 2023

(65) Prior Publication Data
US 2025/0191319 A1 Jun. 12, 2025

(30) Foreign Application Priority Data
Mar. 1, 2022 (IN) ............................ 202241011100

(51) Int. Cl.
*G06T 19/00* (2011.01)
*A63F 13/655* (2014.01)
(Continued)

(52) U.S. Cl.
CPC ............ *G06T 19/00* (2013.01); *A63F 13/655* (2014.09); *A63F 13/795* (2014.09); *G06Q 10/40* (2026.01);
(Continued)

(58) Field of Classification Search
CPC ... G06T 13/40; G06T 19/20; G06T 2219/024; G06T 17/00; G06T 19/006; G06T 19/003; G06T 13/20; G06T 2200/08; G06F 3/011; G06F 3/04815; G06F 3/0482; G06F 3/0481; H04N 21/2187; H04N 7/157
See application file for complete search history.

(56) References Cited

U.S. PATENT DOCUMENTS

2017/0080346 A1* 3/2017 Abbas .................... A63F 13/79
2024/0181349 A1* 6/2024 Lee ........................ A63F 13/35

* cited by examiner

*Primary Examiner* — Hau H Nguyen
(74) *Attorney, Agent, or Firm* — Novel Patent Services LLC

(57) ABSTRACT

The present disclosure relates to a method and system for enabling users to experience an extended reality-based social multiverse. The method includes generating, by an extended reality system, a three-dimensional (3D) avatar of a user based on one of detection of the user in a camera feed associated with a camera on a user device, and auto generation using artificial intelligence. The user is enabled to create a virtual character by overlaying at least one virtual skin on the 3D avatar of the user using one or more user-selectable options. The user is provided access to a verse of a plurality of verses. An extended reality model that corresponds to the verse is executed in response to the verse being accessed. The camera feed is further modified to resemble the verse thereby enabling the user to experience the extended reality-based social multiverse.

19 Claims, 6 Drawing Sheets

(51) Int. Cl.
*A63F 13/795* (2014.01)
*G06Q 10/40* (2026.01)
*G06T 19/20* (2011.01)

(52) U.S. Cl.
CPC ........ *G06T 19/20* (2013.01); *G06T 2219/024* (2013.01); *G06T 2219/2012* (2013.01); *G06T 2219/2021* (2013.01); *G06T 2219/2024* (2013.01)

300

400

METHOD AND SYSTEM FOR ENABLING USERS TO EXPERIENCE AN EXTENDED REALITY-BASED SOCIAL MULTIVERSE

CROSS-REFERENCE TO RELATED APPLICATIONS

This application claims the benefit of Indian Provisional Application No. 202241011100, filed on Mar. 1, 2022, which is incorporated herein in its entirety.

BACKGROUND

Recent advancements in technology have resulted in rapid growth of social platforms that enable content creators to create and share content (for example, videos, audio, or the like). However, on most social platforms, content creators are often subject to trolling or abuse by fringe elements among users of these social platforms. This creates a negative feedback loop for many content creators, causing these content creators to undergo significant mental distress and/or withdraw from content creation. Therefore, there is a need for a technological solution that facilitates free and meaningful engagement of content creators on these social platforms.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments nor delineate the scope of any or all embodiments.

An example of a method of enabling users to experience an extended reality-based social multiverse includes generating, by an extended reality system, a three-dimensional (3D) avatar of a user based on one of detection of the user in a camera feed associated with a camera on a user device, and auto generation using artificial intelligence. The method also includes enabling, by the extended reality system, the user to create a virtual character, where the virtual character is created by overlaying at least one virtual skin on the 3D avatar of the user using one or more user-selectable options. Further, the method includes providing, by the extended reality system, the user access to a verse of a plurality of verses. The method also includes executing, by the extended reality system, an extended reality model that corresponds to the verse in response to the verse being accessed. Moreover, the method includes modifying, by the extended reality system, the camera feed to resemble the verse, thereby enabling the user to experience the extended reality-based social multiverse.

An example of an extended reality system for enabling users to experience an extended reality-based social multiverse includes a communication interface in electronic communication with one or more devices. The extended reality system also includes a memory that stores instructions. The extended reality system further includes a processor responsive to the instructions to generate a three-dimensional (3D) avatar of a user based on one of detection of the user in a camera feed associated with a camera on a user device, and auto generation using artificial intelligence. The processor is also responsive to the instructions to enable the user to create a virtual character, where the virtual character is created by overlaying at least one virtual skin on the 3D avatar of the user using one or more user-selectable options. The processor is further responsive to the instructions to provide the user access to a verse of a plurality of verses. The processor is further responsive to the instructions to execute an extended reality model that corresponds to the verse in response to the verse being accessed. Moreover, the processor is responsive to the instructions to modify the camera feed to resemble the verse thereby enabling the user to experience the extended reality-based social multiverse.

A non-transitory computer-readable storage medium having stored thereon, a set of computer-executable instructions causing a computer comprising one or more processors to perform steps including generating a three-dimensional (3D) avatar of a user based on one of detection of the user in a camera feed associated with a camera on a user device, and auto generation using artificial intelligence. The set of computer-executable instructions further cause one or more processors to perform steps including enabling the user to create a virtual character, where the virtual character is created by overlaying at least one virtual skin on the 3D avatar of the user using one or more user-selectable options. The set of computer executable instructions further cause one or more processors to perform steps including providing the user access to a verse of a plurality of verses. The set of computer-executable instructions further cause one or more processors to perform steps including executing an extended reality model that corresponds to the verse in response to the verse being accessed. Moreover, the set of computer-executable instructions further cause one or more processors to perform steps including modifying the camera feed to resemble the verse, thereby enabling the user to experience the extended reality-based social multiverse.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
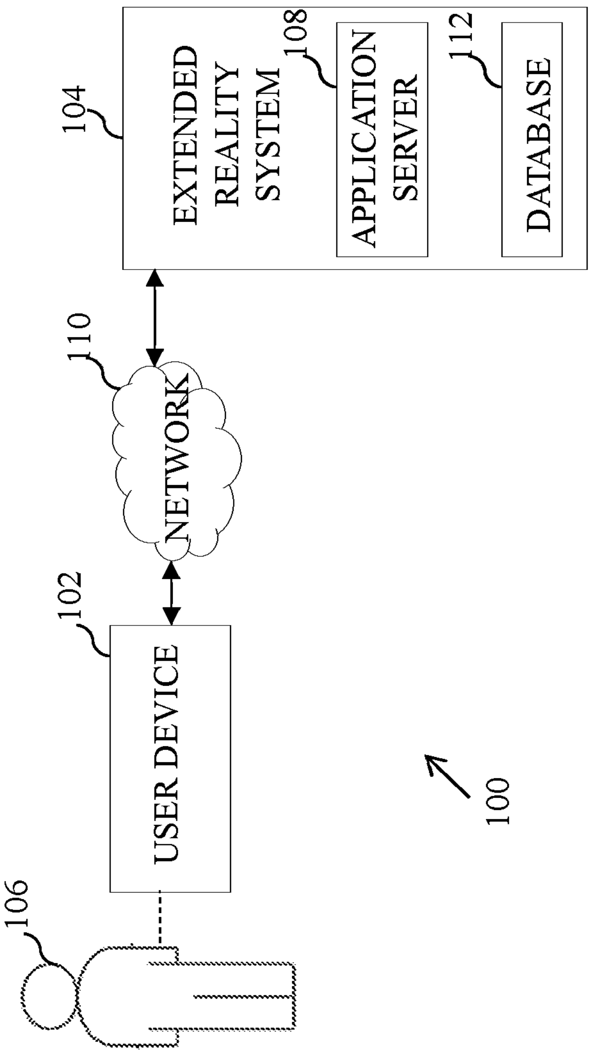
FIG. 1 illustrates a block diagram depicting an environment for implementing an extended reality system, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a block diagram depicting an environment 100 for implementing an extended reality system. In one embodiment herein, the environment 100 includes a plurality of user devices, for example a user device 102, an extended reality system 104, and a plurality of users, for example a user 106. The extended reality system 104 also includes an application server 108. The extended reality system 104 and the user device 102 (and other user devices) may communicate with each other by way of a network 110. The extended reality system 104 further includes a database 112.

In one embodiment herein, the user device 102 may include suitable logic, circuitry, interfaces, and/or code, executable by the circuitry that may be configured to execute one or more instructions based on user input received from the user 106. In a non-limiting example, the user device 102 may be configured to perform various operations to visually scan various objects. In other words, the user device 102 may include an imaging system (for example, a camera; not shown) or an imaging device that enables the user device 102 to scan (for example, photograph, shoot, visually capture, or visually record) objects. Therefore, the user device 102 may be used, by the user 106, to scan objects. For the sake of brevity, the terms "imaging system", "imaging device", and "camera" are used interchangeably throughout the disclosure. The camera may be accessed by way of a service application (not shown) that is installed (for example, executed) on the user device 102. In some embodiments, the camera is a real camera. In other embodiments, the camera is a virtual camera.

In one embodiment herein, the service application may be a standalone application or a web-based application that is accessible by way of a web browser installed (for example, executed) on the user device 102. The service application may be hosted by the application server 108. The service application renders, on a display screen of the user device 102, a graphical user interface (GUI) that enables the user 106 to access an extended reality service offered by the application server 108. Further, the user device 102 may be utilized by the user 106 to perform various operations such as, but not limited to, viewing content (for example, pictures, audio, video, virtual three-dimensional content, or the like), downloading content, uploading content, or the like.

Examples of the user device 102 may include, but are not limited to, a smartphone, a tablet, a laptop, a digital camera, smart glasses, or the like. Some other examples of the user device 102 may include, but are not limited to, a head mounted display specs, which have multiple cameras and gyroscopes and the depth sensors. For the sake of brevity, it is assumed that the user device 102 is a smartphone.

In one embodiment herein, the application server 108 may include suitable logic, circuitry, interfaces, and/or code, executable by the circuitry that may be configured to host the service application and perform one or more operations associated with the implementation and operation of the extended reality system 104.

In one embodiment herein, the application server 108 may be implemented by one or more processors, such as, but not limited to, an application-specific integrated circuit (ASIC) processor, a reduced instruction set computing (RISC) processor, a complex instruction set computing (CISC) processor, and a field programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the application server 108 may be compatible with multiple operating systems.

In one embodiment herein, the network 110 may include suitable logic, circuitry, interfaces, and/or code, executable by the circuitry that may be configured to transmit queries, information, content, format, and requests between various entities, such as the user device 102 and the application server 108. Examples of the network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100 may connect to the network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In one embodiment herein, the GUI of the service application further enables the user 106 to access an extended reality-based social multiverse offered by the application server 108 of the extended reality system 104. The extended reality-based social multiverse includes augmented reality, virtual reality and mixed reality. The extended reality-based social multiverse includes a plurality of verses. Each of the plurality of verses may be a virtual world that is accessible by the plurality of users (for example, the user 106) by way of the service application. The term "verses" is interchangeably referred to as "virtual worlds" throughout the disclosure. Each of the plurality of verses is an extended reality-based virtual world that can be accessed or viewed through cameras in user devices (for example, the camera in the user device 102). The plurality of verses may include verses or virtual worlds with varying sizes, varying characteristics, or the like. Further, a geography of each of the plurality of verses may be linked to a geography of a physical world (for example, real world). The application server 106 may store, therein or in a memory thereof, an extended reality model for each of the plurality of verses. The extended reality model for each verse may completely define characteristics of a corresponding verse. For example, a first extended reality model of a first verse, of the plurality of verses, may indicate that the first verse is a virtual world with a size equivalent to a size of New York City. The first extended reality model may further indicate a mapping between locations in the first verse and locations in New York City. For the sake of brevity, any location in any verse, of the plurality of verses, is referred to as "virtual location", and any location in the physical world (for example, New York City) is referred to as "physical location". Every virtual location in the first verse may be mapped or linked to a physical location (for example, physical locations in New York City). For example, a first virtual location in the first verse may be mapped to the Waldorf Astoria Hotel in New York. Similarly, a second virtual location in the first verse may be mapped to the Statue of Liberty. However, it will be apparent to those of skill in the art that the verses need not be equivalent in size to real-life cities. Sizes of the verses, can correspond to a size of a room, a size of a house, a size of football field, a size of an airport, a size of a city block, a size of a village, a size of a country, a size of planet, or the like. Significance of the plurality of verses and participation of users in the plurality of verses is explained in later paragraphs.

To access the plurality of verses, a user (for example, the user 106) may be required to create a virtual character. In other words, the user 106 is to create one or more virtual characters to engage with any verse of the plurality of verses. To create the virtual character, the user 106 may, using the service application that is executed on the user device 102, access the camera that is included in the user device 102. The camera may be one of a reverse camera or a front camera. In a non-limiting example, it is assumed that the user 106 orients the front camera towards himself. In other words, the user 106 orients the user device 102 in a manner that allows the user 106 to appear in a "viewing range" of the front camera. For the sake of brevity, both the front camera and the reverse camera are simply referred to as "camera" throughout the disclosure. The service application may display camera feed from the camera on the display screen of the user device 102. The service application may detect or recognize the user 106 appearing in the camera feed. Based on the detection of the user 106, the service application may generate a 3D render of the user 106. In other words, the service application may render a 3D avatar of the user 106. The generation of the 3D avatar of the user 106 may be based on various image processing and 3D rendering techniques.

The 3D avatar of the user 106 may look similar to or same as the user 106. Consequently, the service application may display or present the generated 3D avatar of the user 106 on the display screen of the user device 102. Following the display of the 3D avatar of the user 106, the service application may present, on the display screen of the user device 102, a first user-selectable option (not shown). The first user-selectable option enables the user 106 to create the virtual character. Based on the selection of the first user-selectable option by the user 106, the service application may present, on the display screen of the user device 102, a second user-selectable option. The second user-selectable option may enable creation of the virtual character by application (for example, overlaying) of a "virtual skin" on the 3D avatar of the user 106 (for example, the 3D rendering of the user 106). In other words, the service application enables overlaying of a virtual skin on the 3D avatar of the user 106 to change a look or a design of the 3D avatar. The service application may retrieve a plurality of virtual skins and present the plurality of virtual skins on the display screen of the user device 102. The plurality of virtual skins may be retrieved from the application server 108 (for example, a memory of the application server 108), other servers (not shown), or external databases (for example, the database 112, or online databases; not shown).

Each of the plurality of virtual skins when applied to the 3D avatar of the user 106 may result in a new 3D avatar that looks unique and is different from the 3D avatar of the user 106 (for example, original 3D avatar of the user 106). In other words, each of the plurality of virtual skins may be a cosmetic layer that may be overlaid or superimposed on the 3D avatar of the user 106 to change the look or the design of the 3D avatar. Each of the plurality of virtual skins when overlaid on the 3D avatar may alter or change one or more aspects of the 3D avatar of the user 106. For example, a first virtual skin, of the plurality of virtual skins, when overlaid on the 3D avatar may replace a clothing of the 3D avatar with different clothing (for example, superhero clothing, military fatigues, beachwear, or the like). In another example, a second virtual skin, of the plurality of virtual skins, when overlaid on the 3D avatar may replace a head of the 3D avatar with a head of another type of creature (for example, a horse, a squirrel, an alien, or the like). In another example, a third virtual skin, of the plurality of virtual skins, when overlaid on the 3D avatar may replace alter various anatomical features of the user 106 (for example, add more limbs, alter body structure, or the like). In other words, each of the plurality of virtual skins may alter aspects of the 3D avatar to varying degrees. It will be apparent to those of skill in the art that the plurality of virtual skins is not limited to the first through third virtual skins mentioned above. In an actual implementation, the plurality of virtual skins may include any virtual skin or any type of virtual skin that alters the look or the design of the 3D avatar of the user 106.

For the sake of brevity, it is assumed in the current embodiment that the user 106 selects one of the displayed plurality of virtual skins to create the virtual character. However, in another embodiment, the user 106 may select multiple virtual skins to create the virtual character. In another embodiment, the user 106 may create or import his own virtual skin (different from the displayed plurality of virtual skins) for the creation of the virtual character. In another embodiment, the user 106 may create the virtual character from scratch, using the service application. In other words, the user 106 may, using the service application, create the virtual character without the 3D avatar of the user 106.

The service application may create or generate the virtual character for the user 106 by applying or overlaying the virtual skin (for example, the first virtual skin) on the 3D avatar of the user 106. The service application may display the virtual character on the display screen of the user device 102. The service application may further display, on the display screen of the user device 102, one or more user-selectable options. The user selectable options may enable the user 106 to accept the virtual character, replace the virtual skin with another virtual skin, apply additional virtual skins to the virtual character, or make alterations to the virtual character. The alterations that can be made to the virtual character may include a change in a skin tone of the virtual character, a change in a hairstyle of the virtual character, or a change in a body shape of the virtual character. The alterations that can be made to the virtual character may further include, but are not limited to, changes to a costume of the virtual character or addition of one or more cosmetic elements (for example, facial hair, gloves, headgear, eyewear, or the like) to the virtual character.

It will be apparent to those of skill in the art that the alterations that can be made to the virtual character are not limited to those mentioned above and can include any minor or major change to the virtual character. In a non-limiting example, it is assumed that the user 106 accepts the virtual character displayed by the service application. Based on the acceptance by the user 106, the service application may communicate a character creation request to the application server 108. The character creation request may include metadata corresponding to the virtual character and a user identifier that uniquely identifies the user 106 (for example, linked to the user 106). The application server 108 may store, in a corresponding memory or the database 112, the metadata that corresponds to the virtual character, and the user identifier. For the sake of brevity, it is assumed that the user 106 creates a single virtual character (for example, the virtual character). However, in an actual implementation, the user 106 may create multiple virtual characters without deviating from the scope of the disclosure. In some embodiments, the user 106 may create a different virtual character for each of the plurality of verses. Further, the user 106 may modify the virtual character (for example, change the design or look of the virtual character) at any point of time by way of the service application. Similarly, other users of the plurality of users may generate or create another virtual characters accordingly.

In one embodiment, each virtual character in a verse may be associated with a character identifier (for example, a username, a display name, or the like), that uniquely identifies a corresponding virtual character in the verse.

Following the creation or generation of the virtual character, the user 106 may intend to participate in or access the plurality of verses. The GUI of the service application may display, thereon, the user-selectable options, enabling the user 106 to participate in or access any of the plurality of verses. The user 106 may select one of the user-selectable options, based on a verse or virtual world that he intends to access. Based on a selection of one of the user-selectable options (for example, a first user-selectable option), the service application may communicate a model retrieval request to the application server 108. The model retrieval request may be indicative of the first user-selectable option selected by the user 106 (for example, indicative of the verse the user 106 intends to access). Based on the model retrieval request, the application server 108 may communicate a model retrieval response to the user device 102. The model retrieval response may include an extended reality model that corresponds to the verse the user 106 intends to access. Thus, the service application installed on the user device 102 retrieves the extended reality model from the application server 108.

As mentioned earlier, each verse, of the plurality of verses, may be associated with different characteristics (for example, size, terrain, theme, or the like). For example, a first verse may correspond to a pre-historic rainforest. When the user accesses (for example, selects) the first verse, the service application may execute a first extended reality model that corresponds to the first verse, modifying the camera feed to resemble the pre-historic rainforest. In other words, when the user 106 directs the camera to a surrounding environment, the service application may, based on the execution of the first extended reality model, modify the camera feed from the camera included in the user device 102. In other words, when the user 106 scans surrounding environment, using the camera, the service application overlays extended reality elements and extended reality textures on the surrounding environment visible in the camera feed, causing the surrounding environment to resemble the pre-historic rainforest. Further, the service application may, based on a current physical location of the user 106 (for example, current physical location of the user device 102), overlay extended reality elements and extended reality textures that correspond to a virtual location, of the first verse, that is linked to or mapped to the current physical location. For example, if current physical location of the user 106 corresponds to a lobby of Waldorf Astoria Hotel, the overlaid extended reality elements and extended reality textures correspond to a virtual location, of the first verse, that is linked to the lobby of the Waldorf Astoria Hotel.

In another example, a second verse, of the plurality of verses, may correspond to a well-known cartoon (for example, Pokemon®, Transformers®, or the like) or a work of fiction (for example Harry Potter®, Lord of the Rings®, or the like). When the user 106 accesses (for example, selects) the second verse, the service application may execute a second extended reality model that corresponds to the second verse, modifying the camera feed to resemble an environment associated with the cartoon. It will be apparent to those of skill in the art that the above-mentioned examples of the plurality of verses are merely exemplary and do not limit the scope of the disclosure. Each of the plurality of verses may correspond to any type of environment (realistic, imaginary, aspirational, or the like) without deviating from the scope of the disclosure.

In a non-limiting example, it is assumed that the user 106 selects the virtual character and accesses the verse of the plurality of verses. When the user 106 accesses (for example, selects or "enters") the verse of the plurality of verses, the GUI of the service application displays or presents a "verse view" that corresponds to the verse. The verse view presents (for example, displays) the user-selectable options on the display of the user device 102. The user selectable options may enable the user 106 to switch the GUI of the service application between various modes (for example, a set of modes). In a non-limiting example, it is assumed that the set of modes includes a "camera view" and a "discovery map view". For the sake of brevity, hereinafter, the camera view and the discovery map view are referred to as "first mode" and "second mode", respectively. Therefore, the service application enables the user 106 to select one of the set of modes (for example, the first mode and the second mode) when the user 106 enters, access, or selects a verse of the plurality of verses.

In one scenario, it is assumed that a first user selects the first mode. Further, the first user may direct the camera of a first user device towards the surrounding environment of the first user. In a non-limiting example, the first user directs the camera (for example, the front camera) of the first user device towards himself, while he is in the lobby of the Waldorf Astoria Hotel. Therefore, a camera feed of the camera may include the first user and the surrounding environment. As described in the foregoing, the service application that is installed on the first user device executes the first extended reality model. Based on the execution of the first extended reality model and a first virtual character selected by the first user, the service application modifies the camera feed of the camera in the first user device to resemble the first verse. For example, the service application may, based on the execution of the first extended reality model, modify the camera feed that is displayed on the display of the first user device. In other words, the camera feed (for example, original camera feed) may be overlaid with the extended reality elements, and/or the extended reality textures that correspond to the first verse. The first user can move about in the physical world with the camera directed towards his surroundings, scanning his surroundings. Movement between physical locations in the physical world translates to movement between virtual locations in the first verse. Correspondingly, the modified camera feed will change in accordance with the first extended reality model as the first user moves about the first verse.

Surroundings (for example, the surrounding environment) of the first user in the modified camera feed may resemble the first verse. Further, the first user may appear as the first virtual character in the modified camera feed. For example, in the modified camera feed, the first user may appear as a superhero in a pre-historic jungle.

In the first mode ("Camera view"), the first user may create content that is viewable on the first user device and other user devices (for example, the second user device, the third user device, or the like). For the sake of brevity, content created by the users (for example, the first user) in the camera view is designated and referred to as "multi verse content".

For example, the first user may, using the service application executed on the first user device, record a video of himself performing a set of dance moves (for example, first multiverse content). Based on the execution of the first extended reality model, the recorded video may be indicative of the first virtual character performing the set of dance moves in the pre-historic jungle. It will be apparent to those of skill in the art that the first multiverse content created by the first user is not limited to above-mentioned example. Multiverse content created by the first user (or any other user) may include any act or art performed by the first user (or any other user) in the first verse (in the first mode-"Camera view"). The multi verse content created by the first user (or any other user) may be recorded in 3D, such that the recording is indicative of a space (for example, perspective, depth, or the like) associated with corresponding multiverse content.

In some embodiments, the space, accessible through the camera, is a collection of 3D elements and/or experiences that may or may not be anchored to a geo location. Spaces can be accessed through one of discovery maps or metaverse feeds. Discovery maps are an index or a collection of spaces that include environment and elements in the space, experiences, and are temporal and spatial in nature.

Further, the first multiverse content created by the first user may be linked to the physical location where the first user created or recorded the first multiverse content. For example, if the first user created or recorded the first multiverse content at the lobby of the Waldorf Astoria Hotel (hereinafter, referred to as "first physical location"), New York, the first multiverse content may be linked to geographical coordinates of the first physical location. The application server 108 may store, in the memory thereof, the geographical coordinates of the first multiverse content created by the first user. The first physical location may be linked to a first virtual location (for example, the pre-historic jungle) in the first verse. The application server 108 may further store the first character identifier of the first virtual character associated with the first multiverse content.

The first user may share the first multiverse content with other users. For example, the first user may share the first multiverse content with real-life friends (for example, friends of the first user), virtual friends (for example, virtual characters of other users in the first verse), or to a general public (for example, all users or virtual characters) participating in the first verse. In a non-limiting example, it is assumed that the first user intends to share the first multiverse content publicly (for example, with all users or virtual characters participating in the first verse). In such a scenario, the first user selects an option presented by the GUI of the service application to publicly share the first multiverse content. Based on the selection of the option, the service application may communicate a first multiverse content sharing request to the application server 108. The first multiverse content sharing request may indicate that the first multiverse content is to be shared with all users participating in the first verse. In such a scenario, the application server 108 may pin the first multiverse content to the first virtual location in the first verse. How the first multiverse content may be accessed by other users (for example, the second user) participating in the first verse is explained below.

It is assumed that the second user, using the service application installed on the second user device, accesses the first verse. It is further assumed that the second user selects the second virtual character for accessing the first verse. The second user may access the first verse in a manner that resembles a manner of access of the first verse by the first user. The second user may select the second mode ("Discovery view") to consume or view multiverse content (for example, the first multiverse content) created by other users in the first verse. Based on the selection of the second mode, the service application installed on the second user device may retrieve, from the application server, a map of the first verse and present the map of the first verse on the display of the second user device. The map of the first verse may include various types of information associated with the first verse. For example, the map of the first verse may indicate various virtual locations (for example, the first virtual location) in the first verse, the mapping between the various virtual locations in the first verse and various physical locations in New York City, a number of users currently participating or present in the first verse, heat maps indicative of a presence of users at various locations associated with the first verse, geo-tags indicative of virtual locations where multiverse content (for example, the first multiverse content) has been shared by users, or the like.

For example, the map of the first verse may indicate the first virtual character (associated with the first character identifier) has created and shared the first multiverse content at the first virtual location that is linked or mapped to the first physical location. For example, the map of the first verse may include a marker (for example, a pin) against the first physical location, indicating that the first multiverse content created by the first virtual character may be viewed at the first physical location. In other words, users participating in the first verse and that are at the lobby of the Waldorf Astoria Hotel may view the first multiverse content created by the first user by directing cameras on their user devices (for example, the second user device) towards the lobby. The second user, upon reaching the first physical location, may select the marker associated with the first multiverse content. Based on the selection of the marker, the service application may communicate a first multiverse content retrieval request to the application server. The first multiverse content retrieval request is a request for retrieving the first multiverse content from the application server 108. Based on the first multiverse content retrieval request, the application server 108 may communicate a first multiverse content retrieval response, which includes the first multiverse content, to the second user device. Based on the multiverse content retrieval response, the service application may prompt the second user to direct the camera included in the second user device towards a surrounding environment of the second user.

When the second user directs the camera on the second user device towards the lobby, the service application may display the first multiverse content created by the first user at the first physical location (for example, the first virtual location). The second user may be able to view the first multiverse content in 3D. In other words, the second user may view the first multiverse content from various angles or perspectives by changing an orientation of the second user device (for example, the camera included in the second user device). In one embodiment, the second user may react to the first multiverse content.

To react to the first multiverse content, the second user may switch the GUI of the service application from the second mode to the first mode ("Camera view"). The camera view may enable the second user to react to the first multiverse content by allowing the second user to create or draw extended reality doodles or extended reality comments. In a non-limiting example, it is assumed that the second user draws an extended reality doodle to react to the first multiverse content. The extended reality doodle may constitute new multiverse content (for example, second multiverse content) and may be stored in the application server 108 (for example, the memory of the application server 108) and pinned on the map of the first verse. Further, the application server 108 may communicate a notification to the first user device, indicating that the second virtual character has reacted to the first multiverse content. The first user may be required to reach the first physical location to view the second multiverse content.

It will be apparent to those of skill in the art that multiverse content created by users (for example, the first user) is not limited to the users performing acts or art in isolation. Users (for example, the first user, the second user, or the like) may collaborate (for example, in real-life) and create multiverse content with spontaneity such that each user appears as a corresponding virtual character (for example, the first virtual character, the second virtual character, or the like) in the created multiverse content. For example, the first user, the second user, and the third user may, together, record a video in the first verse. The recorded video may show a surrounding environment of the first user, the second user, and the third user in according with the first extended reality model and the first user, the second user, and the third user as the first through third virtual characters, respectively.

In one embodiment, the set of modes may further include a third mode ("2D media mode"). The third mode may enable a user (for example, the first user) to create, shoot, or record videos and/or images in 2D. The content created by the user (for example, the first user) in any verse (for example, the first verse), of the plurality of verses, in the third mode may include overlays associated with a corresponding verse to represent a surrounding environment of the user and a corresponding virtual character (for example, the first virtual character) to represent the user. In a non-limiting example, content created by the users in the third mode may not be linked to any physical location or virtual location. For example, users (for example, the second user) who wish to view 2D content recorded by the first user at the first physical location need not be at the first physical location to view the 2D content. The service application that is installed on the first user device, the second user device, and the third user device, may include an option to enter or select a "multiverse media aggregation view". The multiverse media aggregation view enables users (for example, the first user, the second user, the third user, or the like) to view 2D content created and/or shared by virtual characters from each of the plurality of verses. Therefore, the multiverse media aggregation view is a broadcast feed from the plurality of verses, enabling users to follow or connect with various virtual characters (for example, content creators) from each of the plurality of verses. In some embodiments, a user (for example, the first user) that has created 2D content (for example, 2D video content) in one verse (for example, the first verse) may be able to modify, by way of the service application, the 2D video content by replacing a virtual character in the 2D video content with another virtual character of the user. Similarly, the user may further modify, by way of the service application, the 2D video content by selecting another verse of the plurality of verses. When the user selects another verse, the service application may execute an extended reality model associated with the other verse and modify the 2D video content by replacing an environment in the 2D video content with an environment associated with the other verse (for example, the second verse).

The first multiverse content created by the first user may be communicated by the service application executed on the first user device to the application server 108. The application server 108 may store, in the memory therein or in a database thereof, the content created by the first user. The application server 108 may also store other content created by the first user and content created by other users (for example, the second user, the third user, or the like).

The service application enables virtual characters (for example, the first virtual character) to form connections or "friendships" with other virtual characters (for example, the second virtual character). Details of connections formed between virtual connections may be stored in the application server 108 (for example, the memory of the application server 108). However, even when a virtual character (for example, the first virtual character) forms connections with other virtual characters (for example, the second virtual character), a user (for example, the first user) associated with the virtual character may not be aware of real-life identities of users associated with other virtual characters unless the users choose to reveal their real-life identities. This allows every user participating in the plurality of verses to secure his or her privacy. In other words, pseudonymity of each user accessing the plurality of verses is preserved. In one embodiment, connections or friendships formed between virtual characters is restricted to a corresponding verse. For example, users who are connected to each other in the first verse may not be connected to each other in other verses. Connected users may engage in one-on-one conversations or group conversations while retaining their pseudonymity.

In some embodiments, events (for example, an art exhibition, a boxing match, a music concert, a talk show, or the like) may be hosted by entities (for example, users, companies, or the like) in the plurality of verses. Users (for example, the first user) may attend these events by reaching physical locations associated with these events and directing their cameras, included in corresponding user devices, towards respective environments.

Each user (for example, the first user, the second user, or the like) may, by way of the service application, view a type of data stored by the service application and the application server 108 for a corresponding user.

An example method for enabling users to experience the extended reality-based social multiverse is explained with reference to FIG. 2.

Figure 2A:
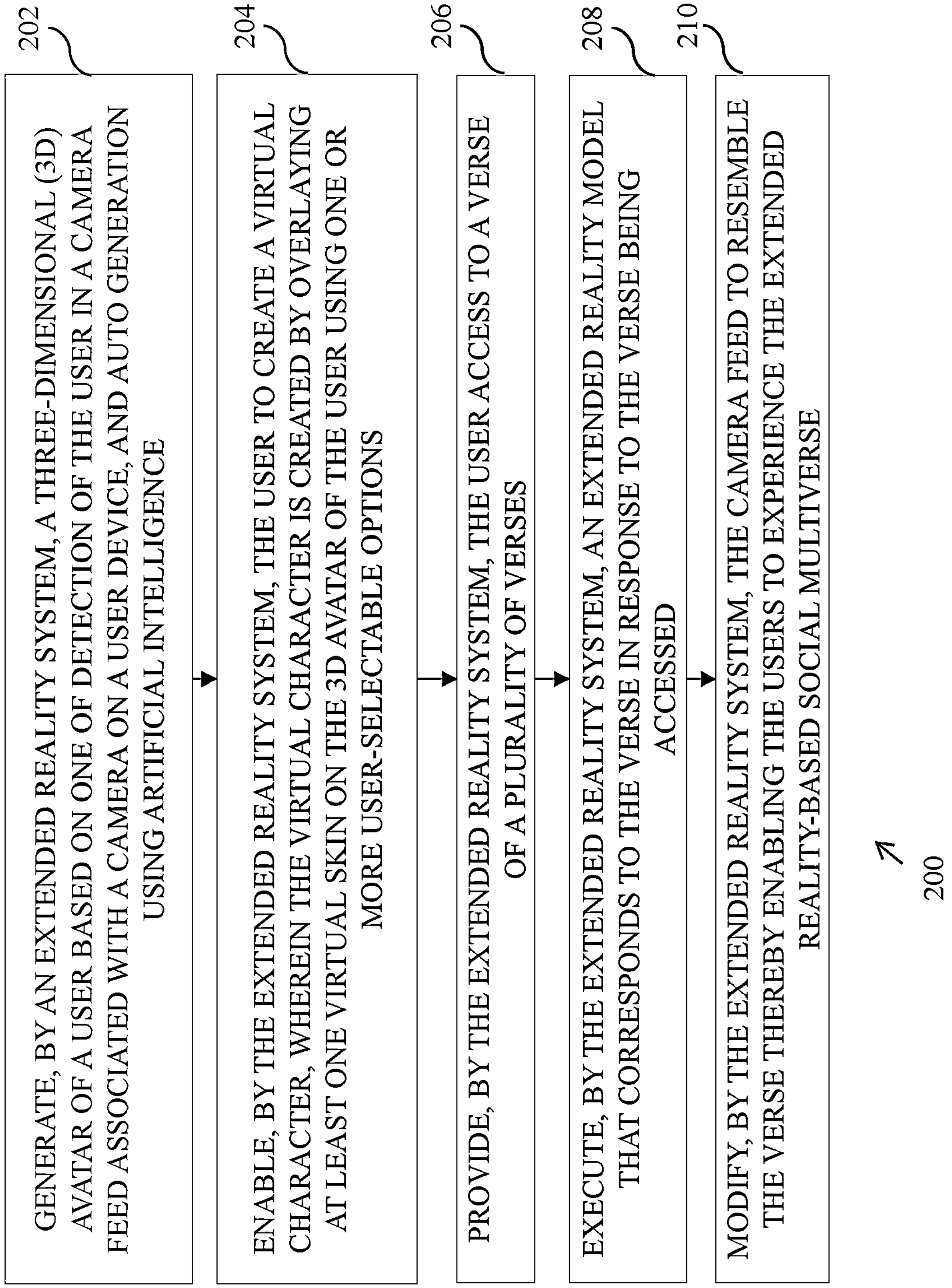
FIG. 2A illustrates a flow diagram of a method for enabling users to experience the extended reality-based social multiverse, in accordance with embodiments of the invention.

FIG. 2A illustrates an example flow diagram of a method 200 for enabling users to experience the extended reality-based social multiverse. At step 202, the method 200 includes generating, by an extended reality system, for example the extended reality system 104 of FIG. 1, a three-dimensional (3D) avatar of a user based on detection of the user, for example the user 106, in a camera feed associated with a camera on a user device for example the user device 102. In some embodiments, the 3D avatar of the user is generated based on a plurality of image processing methods and 3D rendering methods.

In some embodiments, the 3D avatar is one of a photo-realistic avatar, a look-alike avatar, an abstract or arbitrary avatar, for example a dog or a dinosaur. In some embodiments, the 3D avatar is cross compatible over different platforms.

At step 204, the method 200 includes enabling, by the extended reality system the user to create a virtual character. The virtual character is created by overlaying at least one virtual skin on the 3D avatar of the user using one or more user-selectable options.

In some embodiments, the virtual character is created by displaying the one or more user-selectable options on the user device. The user is further enabled to select the one or more user-selectable options to perform one of accept the virtual character, replace a virtual skin with another virtual skin, apply additional virtual skins to the virtual character, and make alterations to the virtual character.

In some embodiments, the alterations include a change in a skin tone of the virtual character, a change in a hairstyle of the virtual character, a change in a body shape of the virtual character, changes to a costume of the virtual character, or addition of a plurality of cosmetic elements to the virtual character.

In some embodiments, the virtual skin alters one or more aspects of the 3D avatar of the user.

At step 206, the method 200 includes providing, by the extended reality system, the user access to a verse of a plurality of verses. The verse includes a plurality of characteristics and corresponds to an environment type.

In some embodiments, the virtual character in the verse is associated with a character identifier that uniquely identifies the virtual character.

In some embodiments, the user is allowed to create a plurality of virtual characters corresponding to the plurality of verses.

At step 208, the method 200 includes executing, by the extended reality system, an extended reality model that corresponds to the verse in response to the verse being accessed.

At step 210, the method 200 includes modifying, by the extended reality system, the camera feed to resemble the verse thereby enabling the users to experience the extended reality-based social multiverse.

The method 200 further includes enabling the user to create multiverse content in the verse with spontaneity. The multiverse content includes an act or an art performed by the user in the verse. The method 200 further includes enabling the user to share the multiverse content to a plurality of users and form connections with other virtual characters in each of the plurality of verses, while maintaining pseudonymity. The method 200 further includes enabling the plurality of users to react to the multiverse content.

In some embodiments, the method 200 further includes quantifying and rating user behaviour by observing user activity in real-time or retrospect, classifying user activity into positive and negative, and providing a quantitative value which can go up and down based on the user behaviour while interacting with the spaces or other users. Fellow participants of multiverse can influence the social score based on the locally acceptable context and the user behaviour (for example up voting or down voting the user behaviour).

In some embodiments, the user behaviour of the user can be managed using a normalization artificial intelligence (AI) model. The normalization AI model observes behaviours of users of a particular space or multiverse, When the user behaviour goes outside an acceptable spectrum, the normalization AI model tries and "normalizes the behaviour" before it is rendered or manifested (for example, a multiverse involving children will automatically re-skin a 3D avatar who may be trying to enter with revealing or in appropriate clothing). The model further auto protects user's social risk by mimicking average of the behaviour of the users on any content they post spontaneously and also normality of the multi verse.

In some embodiments, the user behaviour of the user can be managed using a behavioural consistency model. The behavioural consistency model observes the user behaviour over a period of time. When the user creates an experience and shares it, the behavioural consistency model tries and "adds consistency to the experience" before completing or manifesting action. This auto protects user's social risk by mimicking his behaviour on any content they post spontaneously.

In some embodiments, the method 200 includes a min max model used for creating content. The min max model allows the user to retrospectively go back in timeline and create content clip, prompt-based behaviour generation by typing into the interface to generate actions or animations, behavior extraction and re-use by observing an avatar, recording it, or through gestures. In one example, the user can create a dance sequence and post it by simply writing "Dance on Gangnam style song with those signature moves for 30 seconds, post it on metaverse feed".

In some embodiments, the user can create two-dimensional (2D) content that can be accessed on the multiverse feed. In other embodiments, the user can create 3D extended reality (XR) experiences that are associated with a particular target and tagged to a specific geolocation. Users can access this on discovery maps and the multi verse feed as well.

In some embodiments, 3D scenes and user actions can be recorded based on a field of capture that includes a shape library.

Figure 2C:
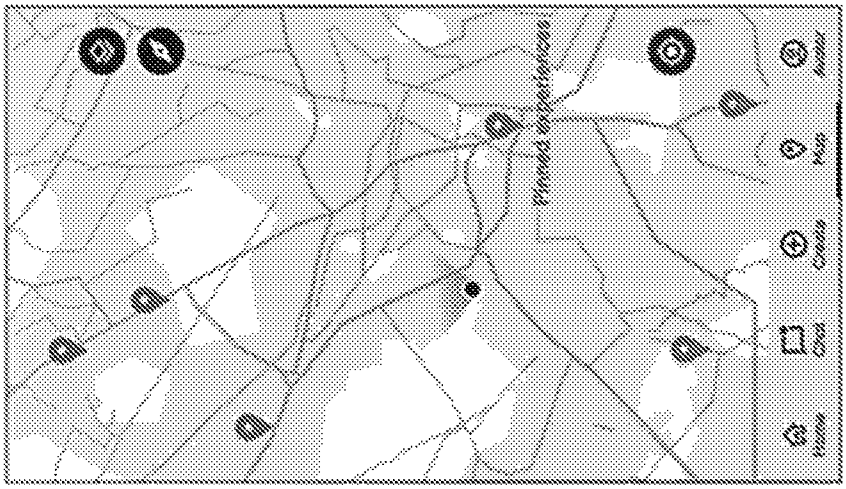
FIG. 2C illustrates an exemplary representation of a discovery map, in accordance with embodiments of the invention.
Figure 2B:
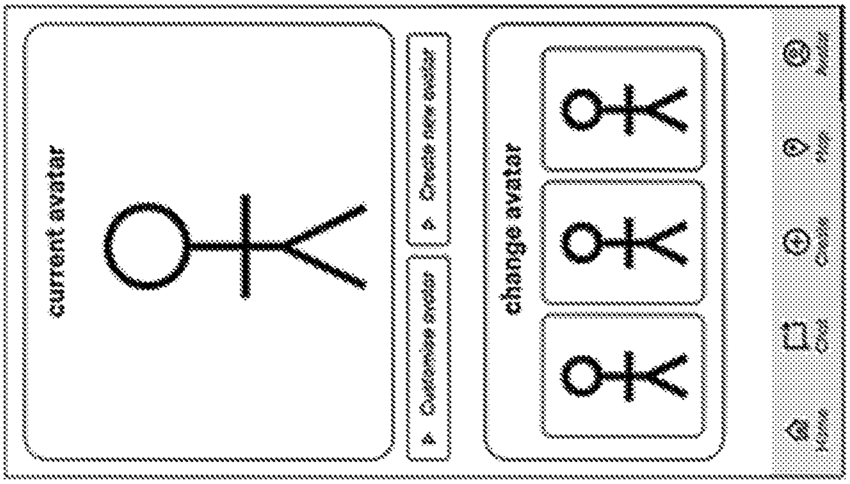
FIG. 2B illustrates an exemplary representation of multiple 3D avatars, in accordance with embodiments of the invention.

An exemplary representation of multiple 3D avatars that can be created and customized is shown in FIG. 2B. An exemplary representation of the discovery map is shown in FIG. 2C.

In some embodiments, the multi verse content created by the user can be accessed through the discovery map. The user physically visits geolocation to access an experience shared by other users, and they can react to the experience through an AR doodle or leave a comment. Such reaction is also be counted as AR creation.

Figure 3:
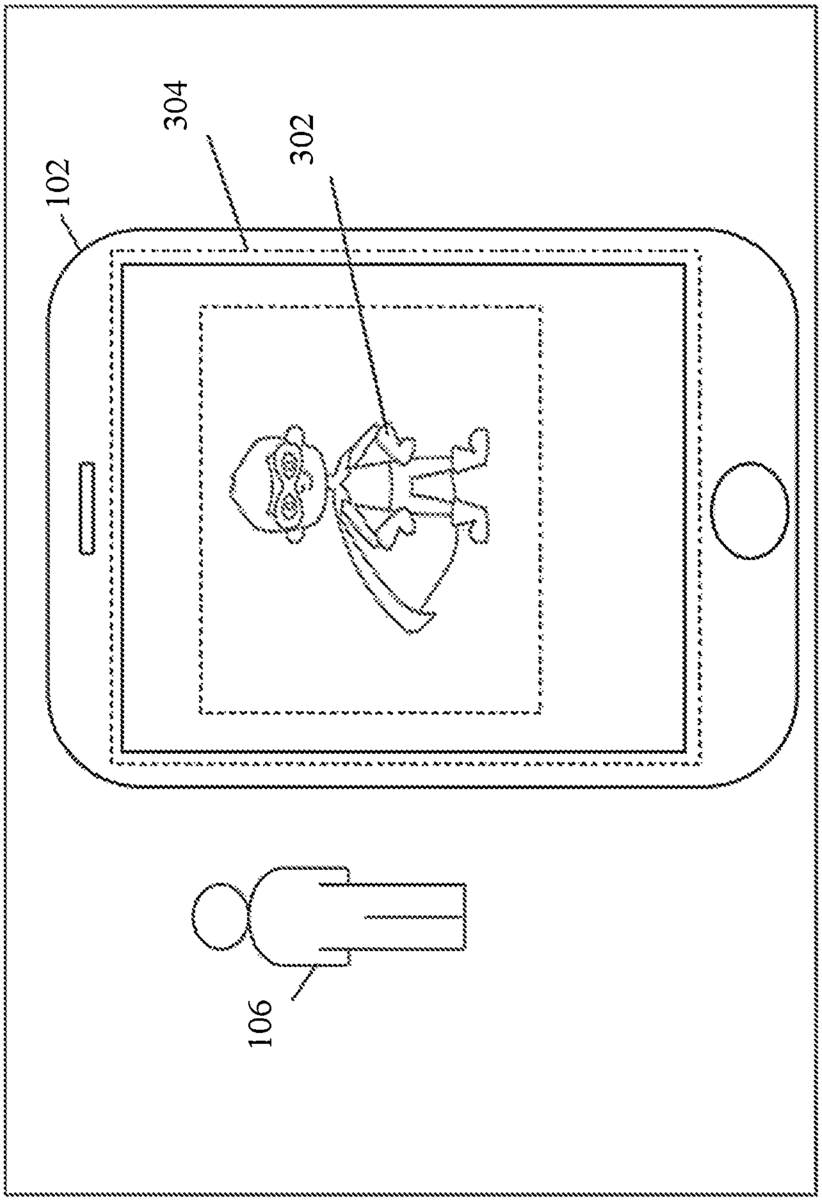
FIG. 3 illustrates a diagram depicting a display of a virtual character, in accordance with embodiments of the invention.

FIG. 3 is an exemplary illustration 300 depicting the display of the virtual character. FIG. 3 is explained in conjunction with FIG. 1. In some embodiments, the virtual character is a digital twin.

In a non-limiting example, the virtual skin corresponds to a superhero costume. Therefore, the virtual character (hereinafter, designated and referred to as "the first virtual character 302") is shown to be a superhero. The virtual character is created by overlaying at least one virtual skin on the 3D avatar of the user 106 using one or more user-selectable options. The first virtual character 302 is presented or displayed on the display screen (hereinafter, designated and referred to as "the display screen 304") of the user device 102.

Figure 4:
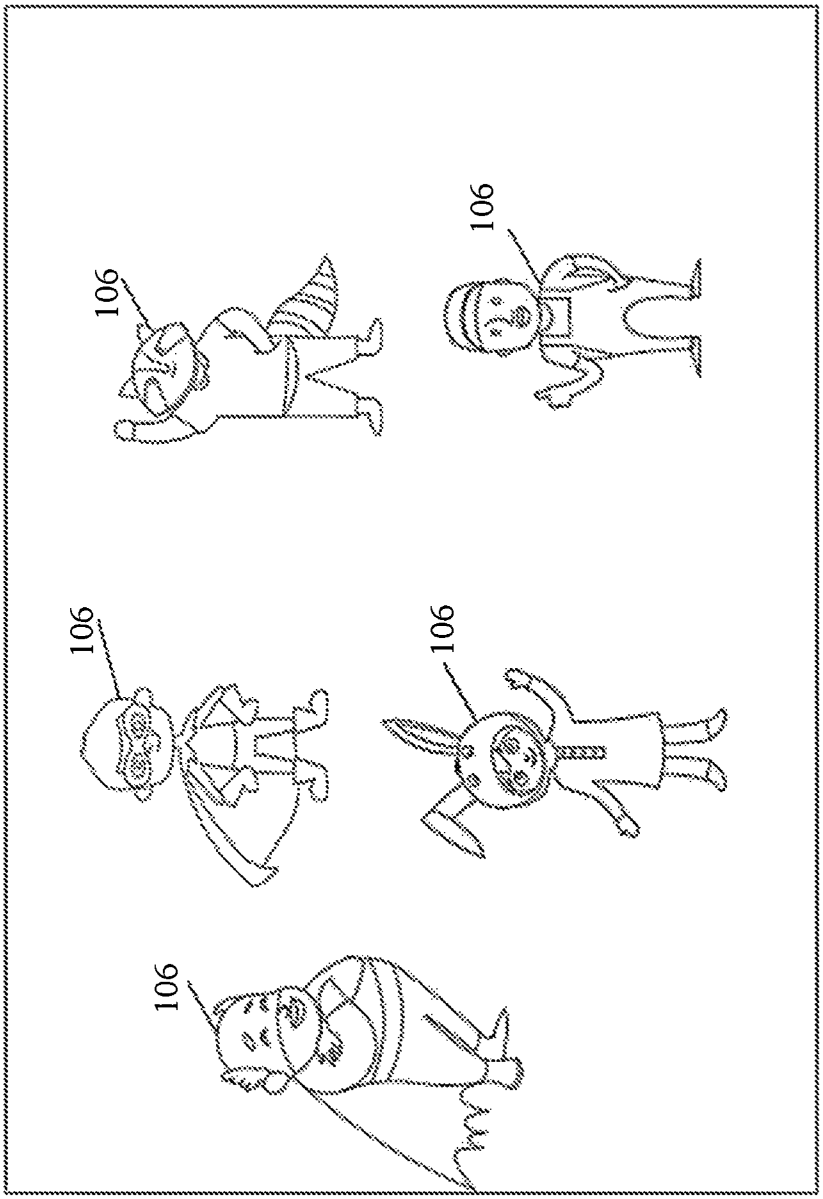
FIG. 4 illustrates a diagram depicting a display of multiverse content, in accordance with embodiments of the invention.

FIG. 4 is an exemplary illustration 400 depicting the display of the multiverse content. FIG. 4 is explained in conjunction with FIG. 1 and FIG. 3. FIG. 4 illustrates the multiverse content which may be a video collaboratively created by the first user, the second user, the third user, a fourth user, and a fifth user. The multiverse content is shown to include the first virtual character 302, the second virtual character (hereinafter, designated and referred to as "the second virtual character 402"), the third virtual character (hereinafter, designated and referred to as "the third virtual character 404"), or the like. The third multiverse content is shown to further include other virtual a fourth virtual character 406 associated with the fourth user and a fifth virtual character 408 associated with a fifth user. It will be apparent to those of skill in the art that the multiverse content shown in FIG. 4 is merely exemplary and is not meant to limit the scope of the disclosure.

Figure 5:
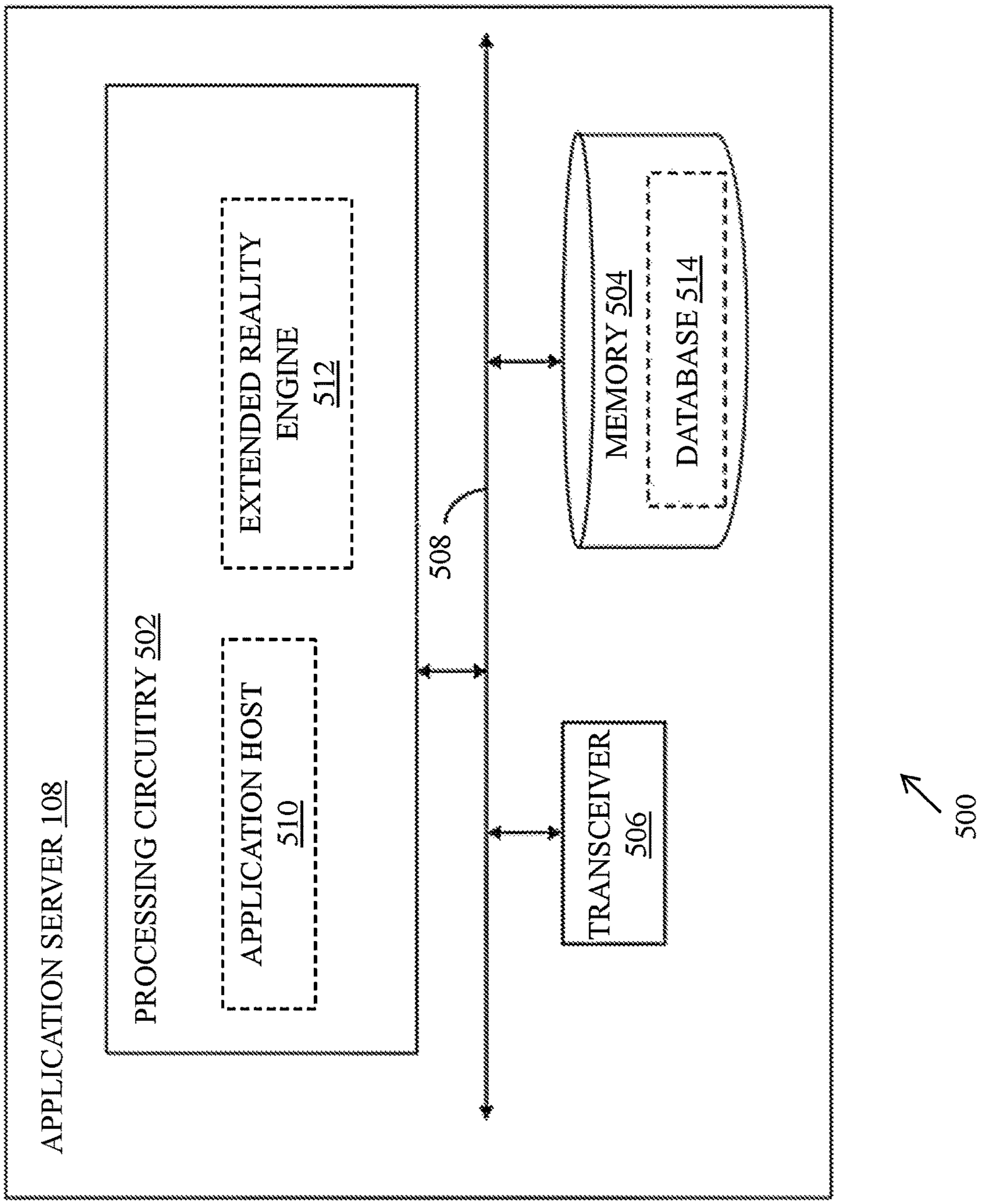
FIG. 5 illustrates a block diagram depicting an application server, in accordance with embodiments of the invention.

FIG. 5 is a block diagram 500 depicting the application server 108. The application server 108 includes processing circuitry 502, a memory 504, and a transceiver 506. The processing circuitry 502, the memory 504, and the transceiver 506 communicate with each other by way of a communication bus 508. The processing circuitry 502 may further include an application host 510 and an extended reality engine 512.

The processing circuitry 502 may include suitable logic, circuitry, interfaces, and/or code, executable by the circuitry that may be configured to execute the instructions stored in the memory 504 to perform various operations to facilitate implementation and operation of the extended reality system. The processing circuitry 502 may perform various operations that enables users to users to create, view, share, and modify content (for example, extended reality content).

Examples of the processing circuitry 502 may include, but are not limited to, an application specific integrated circuit (ASIC) processor, a reduced instruction set computer (RISC) processor, a complex instruction set computer (CISC) processor, a field programmable gate array (FPGA), and the like. The processing circuitry 502 may execute various operations for facilitating operation of the extended reality system by way of the application host 510 and the extended reality engine 512.

The memory 504 may include suitable logic, circuitry, interfaces, and/or code, executable by the circuitry, to store information required for creating, rendering, and sharing extended reality content (for example, the multi verse content, or the like). The memory 504 may include the database (hereinafter, designated and referred to as "the database 514") that stores information (for example, images, identifiers, content, or the like) associated with each content generation request. Information or data stored in the database 514 and the memory 504 has been described in the foregoing description of FIG. 1 and FIG. 2.

Examples of the memory 504 may include a random-access memory (RAM), a read-only memory (ROM), a removable storage drive, a hard disk drive (HDD), a flash memory, a solid state memory, or the like. It will be apparent to a person skilled in the art that the scope of the disclosure is not limited to realizing the memory 504 in the application server 108, as described herein. In another embodiment, the memory 504 may be realized in form of a database server or a cloud storage working in conjunction with the application server 108, without departing from the scope of the disclosure.

The application host 510 may host the service application that enables users (for example, the first user and the second user) to create, view, share, and modify extended reality content. The application host 510 is configured to render the GUI of the service application on user devices (for example, the first user device and the second user device).

Further, the application host 510 is configured to communicate requests to the application server 108 and receive responses from the application server 108.

The extended reality engine 512 may be configured to generate or present extended reality content (for example, the first multiverse content, or the like), based on received requests.

The extended reality engine 512 may be configured to generate 3D avatars of users (for example, the 3D avatar of the first user), apply virtual skins (for example, the first virtual skin) to the 3D avatars, and generate virtual characters (for example, the first virtual character 302). The extended reality engine 512 may be further configured to render and display the virtual characters and the plurality of verses when user devices (for example, the service application executed on the user devices) enter the first through third modes.

The transceiver 506 may include suitable logic, circuitry, interfaces, and/or code, executable by the circuitry, to transmit and receive data over the network 110 using one or more communication protocols. The transceiver 506 may transmit requests and messages to and receive requests and messages from user devices (for example, the first user device, the second user device, or the like). Examples of the transceiver 506 may include, but are not limited to, an antenna, a radio frequency transceiver, a wireless transceiver, a Bluetooth transceiver, an Ethernet port, a universal serial bus (USB) port, or any other device configured to transmit and receive data.

The disclosed methods encompass numerous advantages. The disclosed methods, describe an extended reality-based content creation and sharing ecosystem that facilitates users (for example, the first user) to create virtual characters (for example, the first virtual character 302) by overlaying or applying virtual skins on 3D avatars of the users. The created virtual characters can be customized according to preferences of the users, enabling each user to create a virtual character that is truly unique. The extended reality system 104 allows each user to create multiple virtual characters, facilitating creation of different virtual characters for different verses (for example, the first verse, the second verse, or the like). For example, the first user may create the first virtual character 302 for creating content (for example, first multiverse content) in the first verse with spontaneity, another virtual character for creating content in the second verse with spontaneity, or the like. These virtual characters enable users (for example, the first user) to create content, share content, and form connections with other virtual characters in each of the plurality of verses, while maintaining pseudonymity.

Techniques consistent with the disclosure provide, among other features, an extended reality system that allow content creators to not be subjected to a negative feedback loop thereby enabling the content creators to create content without stress. The present disclosure builds a multiverse, which lets people share or consume content spontaneously, with minimal effort using templates or generative AI, in a way that they really feel, without the fear of being judged or being trolled, in a space where they can be whoever they desire and connect with minds that really mean something to them or resonate with them, where your identity doesn't matter, but your actions do. The present disclosure further establishes and maintains trust and safety by being transparent to user behaviours and user actions, for example if someone takes a screenshot, original user is informed immediately). The present disclosure further enables punishment or penalty for irresponsible behaviour by providing social credit like score to classify user actions in positive or negative.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

We claim:

1. A method of enabling users to experience an extended reality-based social multiverse, comprising:

generating, by an extended reality system, a three-dimensional (3D) avatar of a user based on one of detection of the user in a camera feed associated with a camera on a user device, and auto generation using artificial intelligence;

enabling, by the extended reality system, the user to create a virtual character, wherein the virtual character is created by overlaying at least one virtual skin on the 3D avatar of the user using one or more user-selectable options;

providing, by the extended reality system, the user access to a verse of a plurality of verses;

executing, by the extended reality system, an extended reality model that corresponds to the verse in response to the verse being accessed;

modifying, by the extended reality system, the camera feed to resemble the verse thereby enabling the user to experience the extended reality-based social multiverse;

enabling, by the extended reality system, the user to create multiverse content in the verse with spontaneity, wherein the multiverse content comprises an act or an art performed by the user in the verse; and normalizing user behavior using artificial intelligence in the extended reality system.

2. The method as claimed in claim 1, wherein the 3D avatar of the user is generated based on a plurality of image processing methods and 3D rendering methods.

3. The method as claimed in claim 1, wherein enabling the user to create the virtual character comprises:

displaying, by the extended reality system, the one or more user-selectable options on the user device; and enabling, by the extended reality system, the user to select the one or more user-selectable options to perform one of accept the virtual character, replace a virtual skin with another virtual skin, apply additional virtual skins to the virtual character, and make alterations to the virtual character.

4. The method as claimed in claim 3, wherein the alterations comprise a change in a skin tone of the virtual character, a change in a hairstyle of the virtual character, a change in a body shape of the virtual character, changes to a costume of the virtual character, or addition of a plurality of cosmetic elements to the virtual character.

5. The method as claimed in claim 1, wherein the virtual skin alters one or more aspects of the 3D avatar of the user.

6. The method as claimed in claim 1, wherein the virtual character in the verse is associated with a character identifier that uniquely identifies the virtual character.

7. The method as claimed in claim 1, wherein the verse comprises a plurality of characteristics and corresponds to an environment type.

8. The method as claimed in claim 1, wherein the user is allowed to create a plurality of virtual characters corresponding to the plurality of verses.

9. The method as claimed in claim 1 and further comprising:

enabling, by the extended reality system, the user to share the multiverse content to a plurality of users and form connections with other virtual characters in each of the plurality of verses, while maintaining pseudonymity; and enabling, by the extended reality system, the plurality of users to react to the multiverse content.

10. An extended reality system for enabling users to experience an extended reality-based social multiverse, the extended reality system comprising:

a communication interface in electronic communication with one or more devices;

a memory that stores instructions; and a processor responsive to the instructions to:

generate a three-dimensional (3D) avatar of a user based on one of detection of the user in a camera feed associated with a camera on a user device, and auto generation using artificial intelligence;

enable the user to create a virtual character, wherein the virtual character is created by overlaying at least one virtual skin on the 3D avatar of the user using one or more user-selectable options;

provide the user access to a verse of a plurality of verses;

execute an extended reality model that corresponds to the verse in response to the verse being accessed;

modify the camera feed to resemble the verse, thereby enabling the user to experience the extended reality-based social multiverse;

enable the user to create multiverse content in the verse with spontaneity, wherein the multiverse content comprises an act or an art performed by the user in the verse; and normalize user behavior using artificial intelligence in the extended reality system.

11. The extended reality system as claimed in claim 10, wherein the 3D avatar of the user is generated based on a plurality of image processing methods and 3D rendering methods.

12. The extended reality system as claimed in claim 10, wherein the processor is responsive to the instructions to enable the user to create the virtual character by:

displaying the one or more user-selectable options on the user device; and enabling the user to select the one or more user-selectable options to perform one of accept the virtual character, replace a virtual skin with another virtual skin, apply additional virtual skins to the virtual character, and make alterations to the virtual character.

13. The extended reality system as claimed in claim 12, wherein the alterations comprise a change in a skin tone of the virtual character, a change in a hairstyle of the virtual character, a change in a body shape of the virtual character, changes to a costume of the virtual character, or addition of a plurality of cosmetic elements to the virtual character.

14. The extended reality system as claimed in claim 10, wherein the virtual skin alters one or more aspects of the 3D avatar of the user.

15. The extended reality system as claimed in claim 10, wherein the virtual character in the verse is associated with a character identifier that uniquely identifies the virtual character.

16. The extended reality system as claimed in claim 10, wherein the verse comprises a plurality of characteristics and corresponds to an environment type.

17. The extended reality system as claimed in claim 10, wherein the user is allowed to create a plurality of virtual characters corresponding to the plurality of verses.

18. The extended reality system as claimed in claim 10 and wherein the processor is further responsive to the instructions to:

enable the user to share the multi verse content to a plurality of users and form connections with other virtual characters in each of the plurality of verses, while maintaining pseudonymity; and enable the plurality of users to react to the multi verse content.

19. A non-transitory computer-readable storage medium having stored thereon, a set of computer-executable instructions causing a computer comprising one or more processors to perform steps comprising:

generating a three-dimensional (3D) avatar of a user based on one of detection of the user in a camera feed associated with a camera on a user device, and auto generation using artificial intelligence;

enabling the user to create a virtual character, wherein the virtual character is created by overlaying at least one virtual skin on the 3D avatar of the user using one or more user selectable options;

providing the user access to a verse of a plurality of verses;

executing an extended reality model that corresponds to the verse in response to the verse being accessed;

modifying the camera feed to resemble the verse thereby enabling the user to experience the extended reality-based social multiverse;

enabling the user to create multiverse content in the verse with spontaneity, wherein the multiverse content comprises an act or an art performed by the user in the verse; and normalizing user behavior using artificial intelligence in the extended reality system.

* * * * *